(12) United States Patent
Shibata

(10) Patent No.: US 9,878,581 B2
(45) Date of Patent: Jan. 30, 2018

(54) LAMINATE, INNER LINER MATERIAL AND PNEUMATIC TIRE

(71) Applicant: The Yokohama Rubber Co., Ltd., Tokyo (JP)

(72) Inventor: Hirokazu Shibata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 224 days.

(21) Appl. No.: 14/900,229

(22) PCT Filed: Jun. 24, 2014

(86) PCT No.: PCT/JP2014/066673
§ 371 (c)(1),
(2) Date: Dec. 21, 2015

(87) PCT Pub. No.: WO2014/208539
PCT Pub. Date: Dec. 31, 2014

(65) Prior Publication Data
US 2016/0152075 A1 Jun. 2, 2016

(30) Foreign Application Priority Data

Jun. 24, 2013 (JP) ................................ 2013-132003

(51) Int. Cl.
| | |
|---|---|
| B32B 25/00 | (2006.01) |
| B32B 25/14 | (2006.01) |
| B60C 1/00 | (2006.01) |
| B32B 25/08 | (2006.01) |
| B32B 25/16 | (2006.01) |
| B32B 27/30 | (2006.01) |
| B32B 27/32 | (2006.01) |
| B32B 27/34 | (2006.01) |
| B32B 7/12 | (2006.01) |
| B32B 25/12 | (2006.01) |
| B32B 27/06 | (2006.01) |
| C08K 5/09 | (2006.01) |

(52) U.S. Cl.
CPC ............. *B60C 1/0008* (2013.01); *B32B 7/12* (2013.01); *B32B 25/08* (2013.01); *B32B 25/12* (2013.01); *B32B 25/14* (2013.01); *B32B 25/16* (2013.01); *B32B 27/06* (2013.01); *B32B 27/302* (2013.01); *B32B 27/306* (2013.01); *B32B 27/308* (2013.01); *B32B 27/32* (2013.01); *B32B 27/34* (2013.01); *B32B 2250/02* (2013.01); *B32B 2250/24* (2013.01); *B32B 2255/10* (2013.01); *B32B 2255/26* (2013.01); *B32B 2274/00* (2013.01); *B32B 2605/08* (2013.01); *C08K 5/09* (2013.01)

(58) Field of Classification Search
CPC ....... B32B 25/08; B32B 25/14; B32B 25/042; B32B 2250/03; B32B 2250/24; C08K 5/09; B60C 5/14
See application file for complete search history.

(56) References Cited

U.S. PATENT DOCUMENTS

| | | | | |
|---|---|---|---|---|
| 7,152,642 B2 * | 12/2006 | Serra | ........................ | B60C 1/00 152/209.5 |
| 7,730,919 B2 * | 6/2010 | Kanenari | ............ | B29C 47/0023 152/450 |
| 2006/0151084 A1 * | 7/2006 | Serra | ........................ | B60C 1/00 152/541 |
| 2007/0031661 A1 | 2/2007 | Kanenari | | |
| 2008/0314491 A1 * | 12/2008 | Soeda | ..................... | B32B 25/04 152/510 |

FOREIGN PATENT DOCUMENTS

| | | | |
|---|---|---|---|
| EP | 0 857 761 A1 | 8/1998 | |
| EP | 2 193 939 A1 | 6/2010 | |
| EP | 2 933 098 A1 | 10/2015 | |
| JP | 2000-230054 A | 8/2000 | |
| JP | 4433744 B2 | 3/2010 | |
| JP | 2011-255645 A | 12/2011 | |
| JP | 2012-082323 A * | 4/2012 | ................ C08L 9/00 |
| JP | 2012-082323 A | 4/2012 | |
| WO | WO-2014/097994 A1 | 6/2014 | |

OTHER PUBLICATIONS

Extended European Search Report dated Feb. 6, 2017 in EP Appl. No. 14816748.9.

* cited by examiner

*Primary Examiner* — Rip A Lee
(74) *Attorney, Agent, or Firm* — Polsinelli PC

(57) ABSTRACT

A laminate which is obtained by providing a layer of an adhesive composition, wherein an epoxy-modified elastomer is blended, between a film of a thermoplastic resin or thermoplastic elastomer composition and a layer of a rubber composition, and in which the adhesion between the film and the layer of a rubber composition is further improved. This laminate is characterized in that: the adhesive composition contains a tackifying agent, a vulcanization accelerator, an elastomer and an unsubstituted or substituted aromatic carboxylic acid having a pKa of 1.5-4.0; 50-100% by mass of the elastomer is an epoxy-modified elastomer; and the amount of the aromatic carboxylic acid is 0.5-5 parts by mass per 100 parts by mass of the elastomer.

20 Claims, No Drawings

LAMINATE, INNER LINER MATERIAL AND PNEUMATIC TIRE

CROSS REFERENCE TO RELATED APPLICATIONS

This application is a National Phase filing under 35 U.S.C. § 371 of PCT/jp2014/066673 filed on Jun. 24, 2014; and this application claims priority to Application No. 2013-132003 filed in Japan on Jun. 24, 2013. The entire contents of each application are hereby incorporated by reference.

TECHNICAL FIELD

The present invention relates to a laminate including a film of a thermoplastic resin or a thermoplastic elastomer composition, a layer of an unvulcanized rubber composition, and layer of an adhesive composition disposed between the film and the layer of an unvulcanized rubber composition. The present invention also relates to an inner liner material including the laminate, and a pneumatic tire produced using the laminate as an inner liner material.

BACKGROUND ART

A laminate including a film of a thermoplastic elastomer composition, a layer of a rubber composition, and a layer of an adhesive layer composition disposed therebetween is known as an inner liner material of a pneumatic tire, and to improve the adhesion between the film and the layer of a rubber composition, a technique is known in which an epoxy-modified elastomer is compounded into the adhesive layer composition (Japanese Patent No. 4433744).

CITATION LIST

Patent Literature

[Patent Literature 1] Japanese Patent No. 4433744

SUMMARY OF INVENTION

Problems to be Solved by the Invention

It is an object of the present invention to provide a laminate including a film of a thermoplastic resin or a thermoplastic elastomer composition, a layer of a rubber composition, and a layer disposed therebetween of an adhesive composition including an epoxy-modified elastomer, wherein the adhesion between the film and the layer of a rubber composition is improved.

Means for Solving the Problems

The present inventor discovered that by adding an aromatic carboxylic acid such as salicylic acid to an adhesive composition including an epoxy-modified elastomer, the adhesion between a film and a layer of a rubber composition can be improved, thereby completing the present invention.

Thus, the present invention is a laminate including a film of a thermoplastic resin or a thermoplastic elastomer composition, a layer of an unvulcanized rubber composition including a diene rubber and sulfur, and a layer of an adhesive composition disposed between the film and the layer of an unvulcanized rubber composition, wherein the adhesive composition includes a tackifier, a vulcanization accelerator, an elastomer, and an unsubstituted or substituted aromatic carboxylic acid having a p$K_a$ of 1.5 to 4.0, wherein the elastomer includes 50 to 100% by weight of an epoxy-modified elastomer, and the amount of the aromatic carboxylic acid is 0.5 to 5 parts by weight based on 100 parts by weight of the elastomer.

The present invention is also an inner liner material for pneumatic tires including the laminate.

The present invention is also a pneumatic tire produced using the laminate as an inner liner material.

The present invention includes the following aspects.

[1] A laminate including a film of a thermoplastic resin or a thermoplastic elastomer composition, a layer of an unvulcanized rubber composition including a diene rubber and sulfur, and a layer of an adhesive composition disposed between the film and the layer of an unvulcanized rubber composition, wherein the adhesive composition includes a tackifier, a vulcanization accelerator, an elastomer, and an unsubstituted or substituted aromatic carboxylic acid having a pKa of 1.5 to 4.0, wherein the elastomer includes 50 to 100% by weight of an epoxy-modified elastomer, and the amount of the aromatic carboxylic acid is 0.5 to 5 parts by weight based on 100 parts by weight of the elastomer.

[2] The laminate according to [1], wherein the aromatic carboxylic acid is at least one selected from salicylic acid, 4-aminosalicylic acid, benzoic acid, o-aminobenzoic acid, and 2,4-dihydroxybenzoic acid.

[3] The laminate according to [1] or [2], wherein the epoxy-modified elastomer is obtained by epoxidizing a styrene copolymer having a double bond.

[4] The laminate according to any one of [1] to [3], wherein the vulcanization accelerator is a thiuram type vulcanization accelerator, and the amount of the vulcanization accelerator in the adhesive composition is 0.5 to 10 parts by weight based on 100 parts by weight of the elastomer in the adhesive composition.

[5] The laminate according to any one of [1] to [4], wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

[6] The laminate according to any one of [1] to [4], wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-methacrylate copolymer, and maleic anhydride-modified ethylene-ethyl acrylate copolymer.

[7] An inner liner material for pneumatic tires, including the laminate according to any one of [1] to [6].

[8] A pneumatic tire produced using the laminate according to any one of [1] to [6] as an inner liner material.

Advantageous Effects of Invention

According to the present invention, in a laminate including a film of a thermoplastic resin or a thermoplastic elastomer composition, a layer of a rubber composition, and a layer disposed therebetween of an adhesive composition including an epoxy-modified elastomer, the adhesion between the film and the layer of a rubber composition can be improved by adding an aromatic carboxylic acid to the adhesive composition.

DESCRIPTION OF EMBODIMENTS

The present invention relates to a laminate including a film of a thermoplastic resin or a thermoplastic elastomer composition, a layer of an unvulcanized rubber composition including diene rubber and sulfur, and a layer of an adhesive composition disposed between the film and the layer of an unvulcanized rubber composition.

Examples of the thermoplastic resin constituting the film include polyamide resins, polyester resins, polynitrile resins, polymethacrylate resins, polyvinyl resins, cellulose resins, fluorine resins, imide resins, polystyrene resins, and polyolefin resins.

Examples of polyamide resins include nylon 6 (N6), nylon 66 (N66), nylon 46 (N46), m nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, nylon 66/PP copolymer, and nylon 66/PPS copolymer. Examples of polyester resins include aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, and polyoxyalkylene diimidic acid/polybutyrate terephthalate copolymer. Examples of polynitrite resins include polyacrylonitrile (PAN), polymethacrylonitrile, acrylonitrile/styrene copolymer (AS), methacrylonitrile/styrene copolymer, and methacrylonitrile/styrene/butadiene copolymer. Examples of polymethacrylate resins include polymethyl methacrylate (PMMA) and polyethyl methacrylate. Examples of polyvinyl resins include polyvinyl acetate (PVAc), polyvinyl alcohol (PVA), ethylene-vinyl alcohol copolymer (EVOH), polyvinylidene chloride (PVDC), polyvinyl chloride (PVC), vinyl chloride/vinylidene chloride copolymer, and vinylidene chloride/methyl acrylate copolymer. Examples of cellulose resins include cellulose acetate and cellulose acetate butyrate. Examples of fluorine resins include polyvinylidene fluoride (PVDF), polyvinyl fluoride (PVF), polychlorofluoroethylene (PCTFE), and tetrafluoroethylene/ethylene copolymer (ETFE). Examples of imide resins include aromatic polyimide (PI). Examples of polystyrene resins include polystyrene (PS). Examples of polyolefin resins include polyethylene (PE) and polypropylene (PP). Of these, polyvinyl alcohol, ethylene-vinyl alcohol copolymer, nylon 6, nylon 66, nylon 11, nylon 12, nylon 610, nylon 612, nylon 6/66, nylon MXD6, and nylon 6T are preferred because they provide both fatigue resistance and air barrier properties.

To the thermoplastic resin, compounding ingredients commonly used in a resin composition, such as fillers, reinforcing agents, processing aids, stabilizers, and antioxidants, may be added in order to improve processability, dispersibility, heat resistance, oxidation resistance, and other properties to the extent that the effects of the present invention are not impaired. Plasticizers, which are preferably not added from the viewpoint of air barrier properties and heat resistance, may be added to the extent that the effects of the present invention are not impaired.

The thermoplastic elastomer composition constituting the film is a composition obtained by dispersing an elastomeric component in a thermoplastic resin component, wherein the thermoplastic resin component forms a matrix phase, and the elastomeric component forms a dispersed phase.

The thermoplastic resin component constituting the thermoplastic elastomer composition may be the same thermoplastic resin as described above.

Examples of the elastomeric component constituting the thermoplastic elastomer composition include diene rubbers and hydrogenated versions thereof, olefin rubbers, halogen-containing rubbers, silicone rubbers, sulfur-containing rubbers, and fluororubbers. Examples of diene rubbers and hydrogenated versions thereof include natural rubber (NR), isoprene rubber (IR), epoxidized natural rubber, styrene butadiene rubber (SBR), butadiene rubber (BR) (high cis-BR and low-cis BR), acrylonitrile butadiene rubber (NBR), hydrogenated NBR, and hydrogenated SBR. Examples of olefin rubbers include ethylene propylene rubber (EPM), ethylene propylene diene rubber (EPDM), maleic acid-modified ethylene propylene rubber (M-EPM), maleic anhydride-modified ethylene-α-olefin copolymer, ethylene-glycidyl methacrylate copolymer, maleic anhydride-modified ethylene-ethyl acrylate copolymer (modified EEA), butyl rubber (IIR), copolymer of isobutylene and an aromatic vinyl monomer or a diene monomer, acrylic rubber (ACM), and ionomers. Examples of halogen-containing rubbers include halogenated butyl rubbers such as brominated butyl rubber (Br-IIR) and chlorinated butyl rubber (Cl-IIR), brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), and maleic acid-modified chlorinated polyethylene (M-CM). Examples of silicone rubbers include methyl vinyl silicone rubber, dimethyl silicone rubber, and methyl phenyl vinyl silicone rubber. Examples of sulfur-containing rubbers include polysulfide rubber. Examples of fluororubbers include vinylidene fluoride rubber, fluorine-containing vinyl ether rubber, tetrafluoroethylene-propylene rubber, fluorine-containing silicone rubber, and fluorine-containing phosphazene rubber. Of these, brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer are preferred from the viewpoint of air barrier properties.

To the elastomeric component, compounding ingredients commonly used in a rubber composition, such as any other reinforcing agents (fillers) including carbon black and silica, softeners, age resistors, and processing aids may be added to the extent that the effects of the present invention are not impaired.

Examples of the combination of the elastomeric component and the thermoplastic resin component constituting the thermoplastic elastomer composition include, but are not limited to, halogenated butyl rubber and a polyamide resin, brominated isobutylene-p-methylstyrene copolymer rubber and a polyamide resin, butadiene rubber and a polystyrene resin, isoprene rubber and a polystyrene resin, hydrogenated butadiene rubber and a polystyrene resin, ethylene propylene rubber and a polyolefin resin, ethylene propylene diene rubber and a polyolefin resin, amorphous butadiene rubber and syndiotactic poly(1,2-polybutadiene), amorphous isoprene rubber and trans-poly(1,4-isoprene), and fluororubber and a fluororesin. The combination of butyl rubber and a polyamide resin, which provides excellent air barrier properties, is preferred, and in particular, the combination of brominated isobutylene-p-methylstyrene copolymer rubber, which is a modified butyl rubber, and nylon 6/66, nylon 6, or a blended resin of nylon 6/66 and nylon 6 is particularly preferred because it provides both fatigue resistance and air barrier properties.

The thermoplastic elastomer composition can be prepared by dispersing an elastomeric component (dispersed phase) in a thermoplastic resin component that is to form a matrix phase by melt kneading the thermoplastic resin component and the elastomeric component, for example, in a twin-screw kneading extruder. The weight ratio of the thermoplastic resin component to the elastomeric component is not critical and preferably 10/90 to 90/10, more preferably 15/85 to 90/10.

The thermoplastic resin or the thermoplastic elastomer composition can contain various additives to the extent that the effects of the present invention are not impaired.

The thickness of the film of a thermoplastic resin or a thermoplastic elastomer composition, although not critical, is preferably 0.02 to 1 mm, more preferably 0.04 to 0.5 mm, and still more preferably 0.05 to 0.3 mm. When the thickness is too small, the air barrier properties may be poor, whereas when too large, the advantage in that a tire weight can be reduced due to high air barrier properties will be lost.

The unvulcanized rubber composition constituting the layer of an unvulcanized rubber composition includes a diene rubber and sulfur. The unvulcanized rubber composition can further contain compounding ingredients commonly used in a rubber composition, such as vulcanizing agents, vulcanization acceleration aids, vulcanization accelerators, reinforcing agents (fillers) including carbon black and silica, softeners, age resistors, and processing aids.

Examples of diene rubbers include natural rubber (NR), isoprene rubber (IR), butadiene rubber (BR), styrene butadiene rubber (SBR), and acrylonitrile butadiene rubber (NBR). Of these, natural rubber, butadiene rubber, and styrene butadiene rubber are preferred.

The unvulcanized rubber composition may include a rubber other than diene rubbers to the extent that the effects of the present invention are not impaired. When the unvulcanized rubber composition includes a rubber other than diene rubbers, the diene rubber preferably accounts for at least 50% by weight of the total amount of the rubbers in the unvulcanized rubber composition. When the proportion of the diene rubber is too small, co-crosslinking with an adhesive is less likely to occur, which may result in a reduced adhesion.

Examples of rubbers other than diene rubbers include, but are not limited to, diene rubbers and hydrogenated versions thereof, olefin rubbers, halogen-containing rubbers, silicone rubbers, sulfur-containing rubbers, and fluororubbers. Examples of diene rubbers and hydrogenated versions thereof include natural rubber (NR), isoprene rubber (IR), styrene butadiene rubber (SBR), acrylonitrile butadiene rubber (NBR), hydrogenated NBR, and hydrogenated SBR. Examples of olefin rubbers include ethylene propylene rubber (EPM), ethylene propylene diene rubber (EPDM), maleic acid-modified ethylene propylene rubber (M-EPM), maleic anhydride-modified ethylene-$\alpha$-olefin copolymer, ethylene-glycidyl methacrylate copolymer, maleic anhydride-modified ethylene-ethyl acrylate copolymer (modified EEA), butyl rubber (IIR), copolymer of isobutylene and an aromatic vinyl monomer or a diene monomer, acrylic rubber (ACM), and ionomers. Examples of halogen-containing rubbers include halogenated butyl rubbers such as brominated butyl rubber (Br-IIR) and chlorinated butyl rubber (Cl-IIR), brominated isobutylene-p-methylstyrene copolymer (BIMS), halogenated isobutylene-isoprene copolymer rubber, chloroprene rubber (CR), hydrin rubber (CHR), chlorosulfonated polyethylene (CSM), chlorinated polyethylene (CM), and maleic acid-modified chlorinated polyethylene (M-CM). Examples of silicone rubbers include methyl vinyl silicone rubber, dimethyl silicone rubber, and methyl phenyl vinyl silicone rubber. Examples of sulfur-containing rubbers include polysulfide rubber. Examples of fluororubbers include vinylidene fluoride rubber, fluorine-containing vinyl ether rubber, tetrafluoroethylene-propylene rubber, fluorine-containing silicone rubber, and fluorine-containing phosphazene rubber.

Sulfur in the unvulcanized rubber composition may be any sulfur that is commonly used in a rubber composition as a vulcanizing agent. Examples of sulfurs include powdered sulfur, flower of sulfur, precipitated sulfur, colloidal sulfur, highly dispersible sulfur, and insoluble sulfur.

The amount of sulfur in the unvulcanized rubber composition is preferably 0.5 to 10 parts by weight based on 100 parts by weight of the total amount of the rubbers in the unvulcanized rubber composition, more preferably 1 to 8 parts by weight, and still more preferably 2 to 6 parts by weight. When the amount of sulfur is too small, necessary vulcanization fails to proceed, which may result in a reduced adhesion, whereas when too large, the sulfur may migrate to other adjacent materials.

The thickness of the layer of an unvulcanized rubber composition, although not critical, is preferably 0.2 to 5.0 mm, more preferably 0.4 to 2.0 mm, and still more preferably 0.5 to 1.0 mm. When the thickness is too small, the processability required for use as a rolled material may no provided, whereas when too large, the tire weight may increase.

The adhesive composition constituting the layer of an adhesive composition includes a tackifier, a vulcanization accelerator, an elastomer, and an aromatic carboxylic acid.

Examples of tackifiers include natural resin-based tackifiers, synthetic resin-based tackifiers, and oligomer-based tackifiers, and any of these can be used. Examples of natural resin-based tackifiers include chroman-indene resins, terpene resins, terpene-phenol resins, rosin, rosin esters, and hydrogenated rosin derivatives. Examples of synthetic resin-based tackifiers include alkylphenol-acetylene resins, alkylphenol-formaldehyde resins, $C_5$ petroleum resins, $C_9$ petroleum resins, alicyclic petroleum resins, copolymer petroleum resins, and xylene-formaldehyde resins. Examples of oligomer-based tackifiers include polybutene and liquid rubbers such as liquid polyisoprene. Of these, preferred tackifiers are, for example, terpene resins, terpene-phenol resins, rosin, and $C_5$ petroleum resin.

The amount of the tackifier in the adhesive composition is preferably 10 to 100 parts by weight based on 100 parts by weight of the total amount of the elastomer in the adhesive composition, more preferably 20 to 80 parts by weight, and still more preferably 30 to 70 parts by weight. When the amount of the tackifier is too small, the film may not be provided with sufficient adhesion, and the film may be peeled off a green tire during production, whereas when too large, the adhesion may be reduced.

Examples of the vulcanization accelerator in the adhesive composition include aldehyde-ammonia type ones, aldehyde-amine type ones, thiourea type ones, guanidine type ones, thiazole type ones, sulfenamide type ones, thiuram type ones, dithiocarbamate type ones, and xanthate type ones, and preferred are thiuram type ones.

Thiuram type vulcanization accelerators are compounds each having a thiuram structure, and examples include tetrakis(2-ethylhexyl)thiuram disulfide, tetramethylthiuram disulfide, tetramethylthiuram monosulfide, tetraethylthiuram disulfide, tetrabutylthiuram disulfide, and dipentamethylenethiuram hexasulfide. Of these, tetrakis(2-ethylhexyl)thiuram disulfide, tetrabutylthiuram disulfide, and tetraethylthiuram disulfide are preferred.

The amount of the vulcanization accelerator in the adhesive composition is preferably 0.5 to 10 parts by weight based on 100 parts by weight of the total amount of the elastomer in the adhesive composition, more preferably 1 to 8 parts by weight, and still more preferably 3 to 7 parts by weight. When the amount of the vulcanization accelerator is too small, the adhesive may not be provided with sufficient vulcanized strength, which may result in material failure thereby resulting in peeling, whereas when too large, vulcanization reaction may proceed during the process of, for example, co-extrusion molding.

In the elastomer contained in the adhesive composition, an epoxy-modified elastomer accounts for 50 to 100% by weight. When the proportion of the epoxy-modified elastomer is too small, sufficient adhesion may not be provided.

Epoxy-modified elastomer refers to an elastomer having an epoxy group. An epoxy-modified elastomer can be obtained by copolymerizing an elastomer with an epoxy compound or by epoxidizing some or all of unsaturated bonds of an elastomer using an epoxidizing agent. The epoxy-modified elastomer is preferably one obtained by epoxidizing a styrene copolymer having a double bond, more preferably an epoxy-modified styrene-butadiene block copolymer, and still more preferably an epoxy-modified styrene-butadiene-styrene block copolymer.

The epoxidation of an unsaturated bond can be carried out using a peracid or a hydroperoxide. Examples of peracids include performic acid, peracetic acid, perbenzoic acid, and trifluoroperacetic acid. Examples of hydroperoxides include hydrogen peroxide, t-butyl hydroperoxide, and cumene peroxide. A catalyst such as sulfuric acid and p-toluene sulfonic acid, or a cation exchange resin such as sulfonated polystyrene may optionally be used. The epoxidation is carried out at a temperature of preferably 0° C. to 150° C., more preferably 25° C. to 80° C. The time required to carry out the epoxidation reaction is preferably 0.25 hour to 10 hours, more preferably 0.5 hour to 3 hours.

The epoxidation is preferably carried out in a solvent that is substantially capable of dissolving the elastomer both in its original state and in the state of being epoxidized. Suitable solvents include aromatic solvents such as benzene, toluene, xylenes, and chlorobenzene, cycloaliphatic solvents such as cyclohexane and cyclopentane, and mixtures thereof. After the epoxidation, the epoxy-modified elastomer is preferably removed or isolated from an acidic environment which can include an oxidizing agent and an acidic catalyst. The isolation can be achieved by filtration or by adding a dilute aqueous base to neutralize the acid and then coagulating the polymer. The epoxy-modified elastomer can be coagulated by using an alcohol such as methanol, ethanol, or propanol. After the isolation procedure, an age resistor is typically added, and the final product can be dried using a technique such as vacuum distillation. Alternatively, any other known method for removing the polymer from a hydrocarbon solvent or the like, for example, steam stripping or drum 1.0 drying can be used.

The epoxy-modified elastomer preferably has an oxirane oxygen content of 1.0 to 3.0% by weight, more preferably 1.2 to 2.8% by weight. Too low an oxirane oxygen content can reduce the adhesion to the film, whereas too high an oxirane oxygen content can reduce the adhesion to the layer of a rubber composition.

The epoxy-modified styrene-butadiene block copolymer is available from, for example, Daicel Corporation under the trade names "EPOFRIEND AT501" and "EPOFRIEND CT310".

Examples of elastomers other than epoxy-modified elastomers include, but are not limited to, diene rubbers and hydrogenated versions thereof, olefin rubbers, halogen-containing rubbers, silicone rubbers, sulfur-containing rubbers, and fluororubbers. Examples of diene rubbers and hydrogenated versions thereof include natural rubber (NR), isoprene rubber (IR), styrene butadiene rubber (SBR), acrylonitrile butadiene rubber (NBR), hydrogenated NBR, and hydrogenated SBR. Examples of olefin rubbers include ethylene propylene rubber (EPM), ethylene propylene diene rubber (EPDM), maleic acid-modified ethylene propylene rubber (M-EPM), maleic anhydride-modified ethylene-α-olefin copolymer, ethylene-glycidyl methacrylate copolymer, maleic anhydride-modified ethylene-ethyl acrylate copolymer (modified EEA), butyl rubber (IIR), copolymer of isobutyiene and an aromatic vinyl monomer, or a diene monomer, acrylic rubber (ACM), and ionomers. Examples of halogen-containing rubbers include halogenated butyl rubbers such as brominated butyl rubber (Br-IIR) and chlorinated butyl rubber (Cl-IIR), brominated isobutylene-p-methylstyrene copolymer (BIMS), halogenated isobutylene-isoprene copolymer rubber, chloroprene rubber (CR), hydrin rubber (CFR), chlorosulfonated polyethylene (CSM), chlorinated polyethylene (CM), and maleic acid-modified chlorinated polyethylene (M-CM), Examples of silicone rubbers include methyl vinyl silicone rubber, dimethyl silicone rubber, and methyl phenyl vinyl silicone rubber. Examples of sulfur-containing rubbers include polysulfide rubber. Examples of fluororubbers include vinylidene fluoride rubber, fluorine-containing vinyl ether rubber, tetrafluoroethylene-propylene rubber, fluorine-containing silicone rubber, and fluorine-containing phosphazene rubber.

The adhesive composition includes an unsubstituted or substituted aromatic carboxylic acid having a p$K_a$ of 1.5 to 4.0.

"Aromatic carboxylic acid" refers to a compound formed by substituting at least one hydrogen atom in the aromatic ring of an aromatic compound with a carboxyl group. "Unsubstituted or substituted aromatic carboxylic acid" refers to an unsubstituted aromatic carboxylic acid or a substituted aromatic carboxylic acid. "Unsubstituted aromatic carboxylic acid" refers to an aromatic carboxylic acid having no substituent. "Substituted aromatic carboxylic acid" refers to a compound formed by substituting at least one hydrogen atom in the aromatic ring of an aromatic carboxylic acid with a substituent other than carboxyl. Examples of the substituent other than carboxyl include $C_1$-$C_6$ alkyl, hydroxyl, amino, and halogen.

"p$K_a$" refers to an acid dissociation exponent. "Acid dissociation exponent" refers to a negative common logarithm of an acid dissociation constant $K_a$. In other words, p$K_a$ is represented by the following equation.

$$pK_a = -\log_{10} K_a$$

Smaller p$K_a$ values indicate stronger acids.

The p$K_a$ of the aromatic carboxylic acid is 1.5 to 4.0. When the p$K_a$ is too small, vulcanization of adjacent unvulcanized rubber may be retarded, whereas when too large, the aromatic carboxylic acid in a large amount is necessary to provide sufficient adhesion, and as a result, the desired adhesion may not be provided because the concentration of adhesive components in the adhesive is reduced.

Specific examples of the aromatic carboxylic acid having a pKa of 1.5 to 4.0 include benzoic acid ($pK_a$=4.0), 2,4-dihydroxybenzoic acid ($pK_a$=3.2), salicylic acid (o-hydroxybenzoic acid) ($pK_a$=2.7), o-aminobenzoic acid ($pK_a$=2.0), and 4-aminosalicylic acid ($pK_a$=1.5) and these may be used alone or in combination of two or more.

The amount of the aromatic carboxylic acid in the adhesive composition is 0.5 to 5 parts by weight based on 100 parts by weight of the elastomer in the adhesive composition, preferably 0.5 to 2 parts by weight.

When the amount of the aromatic carboxylic acid is too small, the adhesion-improving effect may not be produced, whereas when too large, the aromatic carboxylic acid may migrate to adjacent unvulcanized rubber to thereby retard vulcanization.

The thickness of the layer of an adhesive composition, although not critical, is preferably 0.01 to 0.3 mm, more preferably 0.02 to 0.2 mm, and still more preferably 0.02 to 0.1 mm. When the thickness is too small, the adhesion may be reduced due to uneven coating or variation in molding, whereas when too large, vulcanization may not proceed sufficiently thereby resulting in reduced adhesion.

The laminate of the present invention can be produced by laminating an adhesive composition and a rubber composition to a film of a thermoplastic resin or a thermoplastic elastomer composition. In one more specific example, it can be produced as described below. First, a thermoplastic resin or a thermoplastic elastomer composition is molded into a film using a molding apparatus, such as an inflation molding apparatus or, a T-die extruder, to prepare a film of the thermoplastic resin or the thermoplastic elastomer composition. Next, an adhesive composition is applied to the film. Further, to the surface onto which the adhesive composition is applied, using an apparatus such as a T-die extruder, a rubber composition is extruded and laminated onto the layer of the adhesive composition to produce a laminate.

The laminate of the present invention can used as an inner liner material for pneumatic tires.

The pneumatic tire of the present invention is a pneumatic tire produced using the laminate as an inner liner material.

The pneumatic tire of the present invention can be produced by any conventional method. For example, the pneumatic tire can be produced as follows: the laminate of the present invention is placed as an inner liner material on a tire-building drum with a film of a thermoplastic resin or a thermoplastic elastomer composition facing the tire-building drum; components conventionally used to produce a tire, such as a carcass layer, a belt layer, and a tread layer composed of unvulcanized rubber, are sequentially laminated thereon; the drum is removed after molding to obtain a green tire; and then the green tire is vulcanized by heating according to a conventional method.

According to the present invention, in a laminate including a film of a thermoplastic resin or a thermoplastic elastomer composition, a layer of a rubber 1.0 composition, and a layer disposed therebetween of an adhesive composition including an epoxy-modified elastomer, the adhesion between the film and the layer of a rubber composition can be improved by adding an aromatic carboxylic acid to the adhesive composition. In particular, when the film of a thermoplastic resin or a thermoplastic elastomer composition includes no plasticizer, sufficient adhesion may not be provided only by the epoxy-modified elastomer, but stronger adhesion can be provided by adding an aromatic carboxylic acid.

EXAMPLES (1) Forming Thermoplastic Resin Film and Thermoplastic Elastomer Composition Film Nylon 6/66 ("UBE Nylon" (registered trademark) 5033B available from Ube Industries, Ltd.) was molded using an inflation molding apparatus to form a film with a thickness of 0.2 mm, which was used as a thermoplastic resin film. One hundred parts by weight of brominated isobutylene-p-methylstyrene copolymer ("Exxpro" (registered trademark) 3035 available from ExxonMobil Chemical), 0.5 part by weight of zinc oxide (Zinc white No. 3 available from Seido Chemical Industry Co., Ltd.), 0.2 part by weight of stearic acid (industrial stearic acid available from Chiba Fatty Acid Co., Ltd.), 1 part by weight of zinc stearate (available from NOF Corporation), 100 parts by weight of nylon 6/66 (nylon 6/66 "UBE Nylon" (registered trademark) 5033B available from Ube Industries, Ltd.), and 10 parts by weight of maleic anhydride-modified ethylene-ethyl acrylate copolymer ("Rilsan BESNOTL" available from ARKEA) were compounded to prepare a thermoplastic elastomer composition, and the thermoplastic elastomer composition was molded using an inflation molding apparatus to form a film with a thickness of 0.2 mm, which was used as a thermoplastic elastomer composition film.

(2) Preparing Rubber Composition

Fifty parts by weight of styrene butadiene rubber ("Nipol" (registered trademark) 1502 available from Zeon Corporation), 50 parts by weight of natural rubber ("SIR-20"), 60 parts by weight of carbon black ("SEAST V" available from Tokai Carbon Co., Ltd.), 1 part by weight of stearic acid (industrial stearic acid available from Chiba Fatty Acid Co., Ltd.), 3 parts by weight of zinc oxide (Zinc white No. 3 available from Seido Chemical Industry Co., Ltd.), 3 parts by weight of sulfur (5% oil-extended sulfur available from Karuizawa Refinery), and 1 part by weight of a vulcanization accelerator (di-2-benzothiazolyl disulfide "Nocceler DM" available from Ouchi Shinko Chemical Industrial Co., Ltd.) were compounded in a Banbury mixer to prepare a rubber composition.

(3) Preparing Adhesive Composition

The following materials were compounded in a Banbury mixer at compounding ratios (parts by weight) shown in Table 1 and Table 2 to prepare adhesive compositions of Examples 1 to 7 and Comparative Examples 1 to 8.

Materials of Adhesive Composition

ESBS: Epoxy-modified styrene-butadiene-styrene block copolymer "EPOFRIEND AT501" available from Daicel Corporation Tackifier: "YS Resin D-105" available from Yasuhara chemical Co., Ltd.

Zinc white: Available from Seido Chemical Industry Co., Ltd.

Vulcanization accelerator: Thiuram type vulcanization accelerator tetrakis(2-ethylhexyl)thiuram disulfide "Nocceler TOT-N" available from Ouchi Shinko Chemical Industrial Co., Ltd.

(4) Producing Laminate

Onto each of the two films formed in (1), the adhesive composition prepared in (3) was applied after being dissolved in toluene to a thickness of 0.05 mm, and onto this, the rubber composition prepared in (2) was extruded and laminated to a thickness of 0.7 mm to produce a laminate.

(5) Evaluation

The laminates produced were evaluated for peel strength, and the adhesive compositions were evaluated for burning properties. The evaluation results are shown in Table 1 and Table 2. Evaluation methods for each item are as described below.

Peel Strength

A sample of the laminate was vulcanized and then cut to a width of 25 mm, and the peel strength of the strip specimen was measured in accordance with JIS-K6256. The measured values of the peel strength (N/25 mm) were indexed with numbers according to the following criteria. All the indices but 0 are in a satisfactory range.

| Index | Peel strength (N/25 mm) |
|---|---|
| 0 | 0 to below 20 |
| 1 | 20 to below 25 |
| 2 | 25 to below 50 |
| 3 | 50 to below 75 |
| 4 | 75 to below 100 |
| 5 | 100 to below 200 |
| 6 | 200 or greater |

Burning Properties

The viscosities of adhesive compositions after being discharged from a mixer were measured in accordance with JIS K6300 at 100° C., with viscosity values, as measured at compounding, of less than twice the viscosity value at the compounding without an unsubstituted or substituted aromatic carboxylic acid being defined as good, and those twice or more as poor.

TABLE 1

(Expressed in parts by weight)

| | Comparative Example 1 | Example 1 | Example 2 | Example 3 | Example 4 | Example 5 | Comparative Example 2 | Comparative Example 3 | Comparative Example 4 |
|---|---|---|---|---|---|---|---|---|---|
| ESBS | 100 | 100 | 100 | 100 | 100 | 100 | 100 | 100 | 100 |
| Tackifier | 60 | 60 | 60 | 60 | 60 | 60 | 60 | 60 | 60 |
| Zinc white | 5 | 5 | 5 | 5 | 5 | 5 | 5 | 5 | 5 |
| Vulcanization accelerator | 5 | 5 | 5 | 5 | 5 | 5 | 5 | 5 | 5 |
| 4-Aminosalicylic acid ($pK_a = 1.5$) | — | 2 | — | — | — | — | — | — | — |
| o-aminobenzoic acid ($pK_a = 2.0$) | — | — | 2 | — | — | — | — | — | — |
| Salicylic acid ($pK_a = 2.7$) | — | — | — | 2 | — | — | — | — | — |
| 2,4-Dihydroxybenzoic acid ($pK_a = 3.2$) | — | — | — | — | 2 | — | — | — | — |
| Benzoic acid ($pK_a = 4.0$) | — | — | — | — | — | 2 | — | — | — |
| L-ascorbic acid ($pK_a = 4.2$) | — | — | — | — | — | — | 2 | — | — |
| 3,4-Dihydroxybenzoic acid ($pK_a = 4.3$) | — | — | — | — | — | — | — | 2 | — |
| Phenylpropionic acid ($pK_a = 4.4$) | — | — | — | — | — | — | — | — | 2 |
| Peel strength (thermoplastic resin film) | 3 | 5 | 5 | 5 | 5 | 5 | 3 | 3 | 3 |
| Peel strength (thermoplastic elastomer composition film) | 3 | 5 | 5 | 5 | 5 | 5 | 3 | 3 | 3 |
| Burning properties | Good | Good | Good | Good | Good | Good | Good | Good | Good |

TABLE 2

(Expressed in parts by weight)

| | Comparative Example 5 | Comparative Example 6 | Example 6 | Example 7 | Comparative Example 7 | Comparative Example 8 |
|---|---|---|---|---|---|---|
| ESBS | 100 | 100 | 100 | 100 | 100 | 100 |
| Tackifier | 60 | 60 | 60 | 60 | 60 | 60 |
| Zinc white | 5 | 5 | 5 | 5 | 5 | 5 |
| Vulcanization accelerator | 5 | 5 | 5 | 5 | 5 | 5 |
| 4-Aminosalicylic acid ($pK_a = 1.5$) | — | — | — | — | — | — |
| o-aminobenzoic acid ($pK_a = 2.0$) | — | — | — | — | — | — |
| Salicylic acid ($pK_a = 2.7$) | 0.1 | 03 | 0.5 | 1 | 8 | 10 |
| 2,4-Dihydroxybenzoic acid ($pK_a = 3.2$) | — | — | — | — | — | — |
| Benzoic acid ($pK_a = 4.0$) | — | — | — | — | — | — |
| L-ascorbic acid ($pK_a = 4.2$) | — | — | — | — | — | — |
| 3,4-Dihydroxybenzoic acid ($pK_a = 4.3$) | — | — | — | — | — | — |
| Phenylpropionic acid ($pK_a = 4.4$) | — | — | — | — | — | — |
| Peel strength (thermoplastic resin film) | 3 | 3 | 4 | 5 | 3 | 2 |
| Peel strength (thermoplastic elastomer composition film) | 3 | 3 | 5 | 5 | 3 | 2 |
| Burning properties | Good | Good | Good | Good | Poor | Poor |

INDUSTRIAL APPLICABILITY

The laminate of the present invention is suitable for use in producing a pneumatic tire. The pneumatic tire of the present invention is suitable for use as a car tire.

The invention claimed is:

1. A laminate, comprising:
   a film of a thermoplastic resin or a thermoplastic elastomer composition;
   a layer of an unvulcanized rubber composition comprising a diene rubber and sulfur; and
   a layer of an adhesive composition disposed between the film and the layer of an unvulcanized rubber composition, wherein the adhesive composition comprises a tackifier, a vulcanization accelerator, an elastomer, and an unsubstituted or substituted aromatic carboxylic acid having a $pK_a$ of 1.5 to 4.0, wherein the elastomer comprises 50 to 100% by weight of an epoxy-modified elastomer, and the amount of the aromatic carboxylic acid is 0.5 to 5 parts by weight based on 100 parts by weight of the elastomer.

2. The laminate according to claim 1, wherein the aromatic carboxylic acid is at least one selected from salicylic acid, 4-aminosalicylic acid, benzoic acid, o-aminobenzoic acid, and 2,4-dihydroxybenzoic acid.

3. The laminate according to claim 1, wherein the epoxy-modified elastomer is obtained by epoxidizing a styrene copolymer having a double bond.

4. The laminate according to claim 1, wherein the vulcanization accelerator is a thiuram type vulcanization accelerator, and the amount of the vulcanization accelerator in the adhesive composition is 0.5 to 10 parts by weight based on 100 parts by weight of the elastomer in the adhesive composition.

5. The laminate according to claim 1, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

6. The laminate according to claim 1, wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

7. An inner liner material for pneumatic tires, comprising the laminate according to claim 1.

8. A pneumatic tire produced using the laminate according to claim 1 as an inner liner material.

9. The laminate according to claim 2, wherein the epoxy-modified elastomer is obtained by epoxidizing a styrene copolymer having a double bond.

10. The laminate according to claim 9, wherein the vulcanization accelerator is a thiuram type vulcanization accelerator, and the amount of the vulcanization accelerator in the adhesive composition is 0.5 to 10 parts by weight based on 100 parts by weight of the elastomer in the adhesive composition.

11. The laminate according to claim 2, wherein the vulcanization accelerator is a thiuram type vulcanization accelerator, and the amount of the vulcanization accelerator in the adhesive composition is 0.5 to 10 parts by weight based on 100 parts by weight of the elastomer in the adhesive composition.

12. The laminate according to claim 3, wherein the vulcanization accelerator is a thiuram type vulcanization accelerator, and the amount of the vulcanization accelerator in the adhesive composition is 0.5 to 10 parts by weight based on 100 parts by weight of the elastomer in the adhesive composition.

13. The laminate according to claim 2, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

14. The laminate according to claim 3, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

15. The laminate according to claim 4, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

16. The laminate according to claim 9, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

17. The laminate according to claim 2, wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

18. The laminate according to claim 3, wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

19. The laminate according to claim 4, wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

20. The laminate according to claim 9, wherein the thermoplastic elastomer composition is a composition obtained by dispersing an elastomeric component in a thermoplastic resin component, the thermoplastic resin component being at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T, the elastomeric component being at least one selected from the group consisting of brominated isobutylene-p-methylstyrene copolymer, maleic anhydride-modified ethylene-α-olefin copolymer, ethylene-glycidyl methacrylate copolymer, and maleic anhydride-modified ethylene-ethyl acrylate copolymer.

* * * * *